(12) United States Patent
Mensah

(10) Patent No.: US 11,991,985 B2
(45) Date of Patent: May 28, 2024

(54) TOUCHLESS PAW CARE DEVICE

(71) Applicant: Kirk Mensah, Laurel, MD (US)

(72) Inventor: Kirk Mensah, Laurel, MD (US)

(73) Assignee: Jusmik Enterprises LLC, Lewes, DE (US)

( * ) Notice: Subject to any disclaimer, the term of this patent is extended or adjusted under 35 U.S.C. 154(b) by 326 days.

(21) Appl. No.: 17/452,189

(22) Filed: Oct. 25, 2021

(65) Prior Publication Data

US 2023/0050518 A1    Feb. 16, 2023

Related U.S. Application Data

(63) Continuation of application No. 17/402,530, filed on Aug. 14, 2021, now abandoned.

(51) Int. Cl.
*A01K 13/00* (2006.01)

(52) U.S. Cl.
CPC .................. *A01K 13/001* (2013.01)

(58) Field of Classification Search
CPC ......... A01K 13/001; F26B 5/12; F26B 13/16; F26B 13/30; A47L 5/38; A47L 23/263; B08B 5/04
See application file for complete search history.

(56) References Cited

U.S. PATENT DOCUMENTS

| | | | |
|---|---|---|---|
| 3,564,641 A * | 2/1971 | Meyer | A47L 5/24 |
| 4,559,903 A | 12/1985 | Bloom | |
| 5,261,541 A * | 11/1993 | Li | A47F 7/00 |
| | | | 211/62 |
| 5,289,612 A * | 3/1994 | Glenn | A47L 9/00 |
| | | | 15/326 |
| 10,674,707 B1 | 6/2020 | Srinivasan | |
| 2016/0095486 A1* | 4/2016 | Al Salameh | A47L 9/28 |
| 2020/0113153 A1* | 4/2020 | Yoo | A01K 13/00 |

FOREIGN PATENT DOCUMENTS

| | | |
|---|---|---|
| CN | 201734639 U | 2/2011 |
| CN | 204293048 U | 4/2015 |
| CN | 112167085 A | 1/2021 |
| DE | 20212476 U1 | 2/2004 |
| DE | 202006003765 U1 | 8/2007 |
| FR | 2707074 B1 | 9/1995 |
| GB | 1536067 A | 12/1978 |
| KR | 100663966 B1 | 12/2006 |
| KR | 101275847 B1 | 6/2013 |
| KR | 101596917 B1 | 2/2016 |
| KR | 1020180078541 A | 7/2018 |
| KR | 1020210070649 A | 6/2021 |
| WO | 2017124669 A1 | 7/2017 |
| WO | 2021086118 A1 | 5/2021 |

* cited by examiner

*Primary Examiner* — Joshua J Michener
*Assistant Examiner* — Henry Hooper Mudd
(74) *Attorney, Agent, or Firm* — Tinch Law Firm P.C.; J. Greg Tinch, Esq.

(57) ABSTRACT

A quiet and compact device for touchless cleaning and drying of a pet animal's paws by positioning the pet animal in the device and causing the device to either force air over or suck air away from a pet animal's paws. A device with a form factor convenient for using to clean the paws of pet animals, e.g. domesticated quadruped animals.

2 Claims, 7 Drawing Sheets

TOUCHLESS PAW CARE DEVICE

CROSS REFERENCE TO RELATED APPLICATION

The present application is a continuation of U.S. Non-Provisional application Ser. No. 17/402,530 filed on Aug. 14, 2021, which, in turn, cross references and claims benefit of U.S. Provisional Application No. 63/065,712 filed on Aug. 14, 2020. This application is related to application Ser. No. 17/452,142 filed on Oct. 25, 2021. The above identified patent applications are herein incorporated by reference in their entirety to provide continuity of disclosure.

BACKGROUND

The field of endeavor is household pet animal care, Specifically, this device solves problems related to cleaning and sanitizing the paws of dogs, cats and other household pet animals.

Dogs and cats are by far the most common household pets in the world—as of 2018 there were an estimated 470 million pet dogs and 370 million pet cats. Household pet animals depend on their owners to feed them and provide for their health and wellness, including exercise. Accordingly, dog owners, and some cat owners, walk their pet animals outside to provide exercise, maintain healthy weight and fitness levels, and to maintain the pets' house training, e.g. so the pet can evacuate waste. Dogs and cats can walk outside without "shoes" because their paws are tough and protect them from hard and jagged things on the ground. Paws do not, however, protect pet animals, or the human families with whom they cohabitate, from outside germs and bacteria that may attach to, and proliferate in, an animal's paws. Pet animals are prone to track germs, bacteria, and moisture from outdoors into the homes where they live, which is deleterious to the health and comfort of both humans and pets living in the home. As a case in point, excess moisture retained in a pet's paws can cause the paws to become wrinkled, sensitive and more prone to injury.

Many owners manually clean and dry their household pet's paws after walking them outside, which is a cost-effective and time-consuming solution. Anecdotally, it can take up to two minutes to thoroughly dry, clean, and otherwise condition a household pet's paws for reentry into the home. By extension, and since household pets are quadrupeds, it can take up to eight minutes to treat all of the animal's paws before it reenters the home. This estimate is multiplied for owners of multiple dogs. Depending on the owner's schedule, the dog's feeding schedule, and exercise tolerance, a dog owner likely will take his or her animal for multiple walks each day. By way of example, a dog owner who takes her pet out three times per day can spend on the order of twenty-four minutes or more simply preparing her dog to re-enter the house.

Solutions disclosed in this field of endeavor include forced hot air "paw dryers." These solutions teach a device that blows heated air on the pet's paws to dry the paws by way of convective heat transfer. This solution is suboptimal for dogs whose paws are sensitive to heat. The state of the art does not contemplate a solution for dogs with noise anxiety or noise sensitivity. The sound caused by actuating the motorized components of these devices may startle the dog and trigger its flight response. These dogs who have a bad experience with the "paw dryer" device will likely resist using it, which will likely add lead time to the process of conditioning the dogs paws to re-enter its home.

This disclosure addresses these and other problems to advance the state of the art.

BRIEF SUMMARY OF THE DISCLOSURE

It is an object of this disclosure to teach a quiet and compact solution for cleaning and drying a pet animal's paws.

It is another object of this disclosure to teach a solution for cleaning and drying a pet animal's paws where touching of the paws, and thus spreading germs and bacteria, is not required.

Still another object of this disclosure is to teach a novel solution for cleaning and drying a paws of pet animals who experience noise anxiety.

Still another object of this disclosure is to teach a novel system and method for conditioning a pets paws to reduce moisture and germ spread.

These and other objects are satisfied by A touchless paw care device comprising: a base adapted to have a partial opening for exhaust; a touchless paw care module having a first and a second paw cup, at least a first vacuum hose, a motor, wherein the at least first vacuum hose is adapted to be mechanically coupled to the first paw cup, the second paw cup and the motor; wherein the touchless paw care module mechanically coupled to the base; a controller, wherein the controller is electrically coupled to the touchless paw care module via the motor, and wherein the controller mechanically coupled to the base; a switch, wherein the switch is electrically coupled to the controller, and wherein the switch mechanically coupled to the base; and a power source, wherein the power source is electrically coupled to the switch.

Other objects are satisfied by A touchless paw care device comprising: a base having a top enclosure and a bottom enclosure, the bottom enclosure adapted to have a partial opening for exhaust, the bottom enclosure adapted to be mechanically coupled to the top enclosure, the bottom enclosure adapted to have a first, a second, a third, and a fourth foot protrusion; a touchless paw care module having a first and a second paw cup insert, a first and a second paw cup, the first and the second paw cup insert removably coupled to the first and second paw cup, a vacuum hose, a three-way connector, the vacuum hose adapted to be mechanically coupled to the first paw cup and the second paw cup by the three way connector, a reversible electric motor, the reversible electric motor mechanically coupled to the vacuum hose, a muffler, the muffler mechanically coupled to the motor; wherein the touchless paw care module mechanically coupled to the base; a controller, the controller electrically coupled to the touchless paw care module via the motor and mechanically coupled to the base; a switch, the switch electrically coupled to the controller and mechanically coupled to the base; and a power source electrically coupled to the switch and mechanically coupled to the base.

Still other objects are satisfied by A method for cleaning a pet animal's paws comprising: positioning a pet animal in a touchless paw care device, the touchless paw care device having a base having a top enclosure and a bottom enclosure, the bottom enclosure adapted to have a partial opening for exhaust, the bottom enclosure adapted to be mechanically coupled to the top enclosure, the bottom enclosure adapted to have a first, a second, a third, and a fourth foot protrusion; a touchless paw care module having a first and a second paw cup insert, a first and a second paw cup, the first and the second paw cup insert removably coupled to the first and second paw cup, a vacuum hose, a three-way connector, the vacuum hose adapted to be mechanically coupled to the first paw cup and the second paw cup by the three way connector, a reversible electric motor, the reversible electric motor mechanically coupled to the vacuum hose, a muffler, the muffler mechanically coupled to the motor; wherein the touchless paw care module mechanically coupled to the base; a controller, the controller electrically coupled to the touchless paw care module via the motor and mechanically coupled to the base; a switch, the switch electrically coupled to the controller and mechanically coupled to the base; and a power source electrically coupled to the switch and mechanically coupled to the base; and toggling the touchless paw care device between either a first state wherein the touchless paw care device blows air on the pet animal's paws or a second state wherein the touchless paw care device sucks air away from the pet animal's paws.

BRIEF DESCRIPTION OF THE SEVERAL VIEWS OF THE DRAWINGS

To understand the present invention, it will now be described by way of example, with reference to the accompanying drawings in which.

DETAILED DESCRIPTION

A sampling of embodiments of the present invention are described herein. It should be understood, however, that these examples should not be interpreted to limit the invention to the embodiments shown and described in this disclosure.

As used in this disclosure, a "muffler" is a sound dampening device, i.e. a device that muffles sound. A "muffler" as used in this disclosure serves a similar function as a car muffler.

As used in this disclosure, "pet animals" is any domesticated quadruped animal including dogs, cats, pigs, etc.

Figure 1:
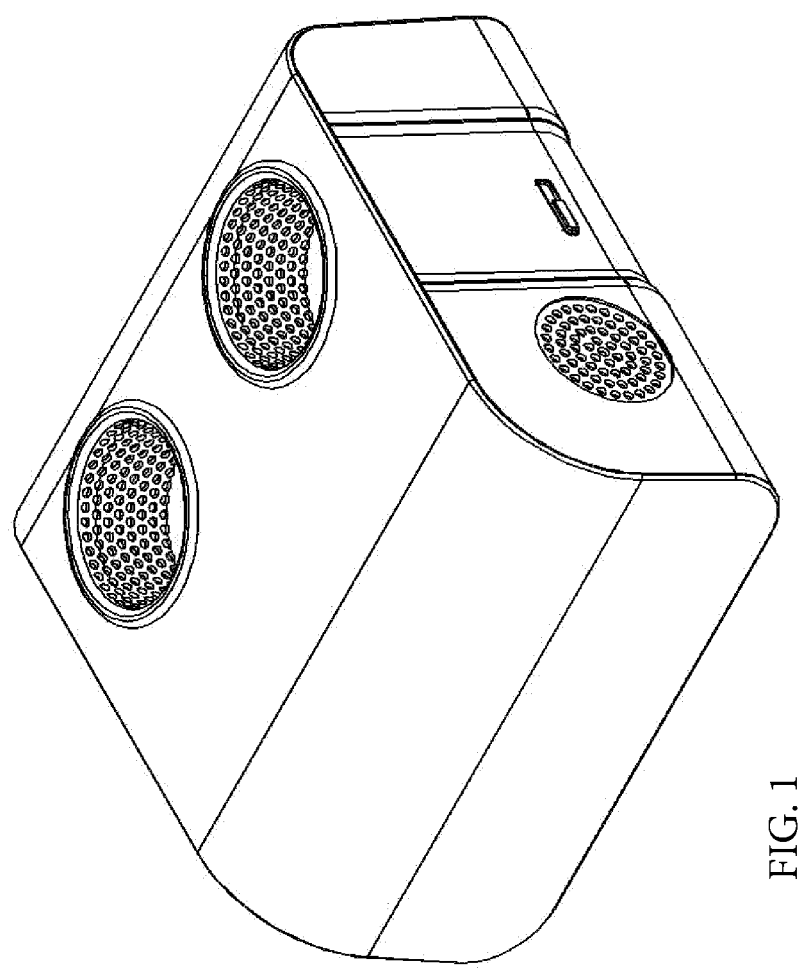
FIG. 1 shows a perspective view of a touchless paw care device according to a first embodiment.

FIG. 1 shows a touchless paw care device according to one embodiment. The touchless paw care device 100 features a compact design. In embodiments, the constituent components of a touchless paw care device may be enclosed in an enclosure measuring approximately 14.1 inches wide by 13.35 inches long by 3.5 inches deep. In embodiments, a touchless paw care device comprises a touchless paw care module mechanically coupled to a base.

Figure 2:
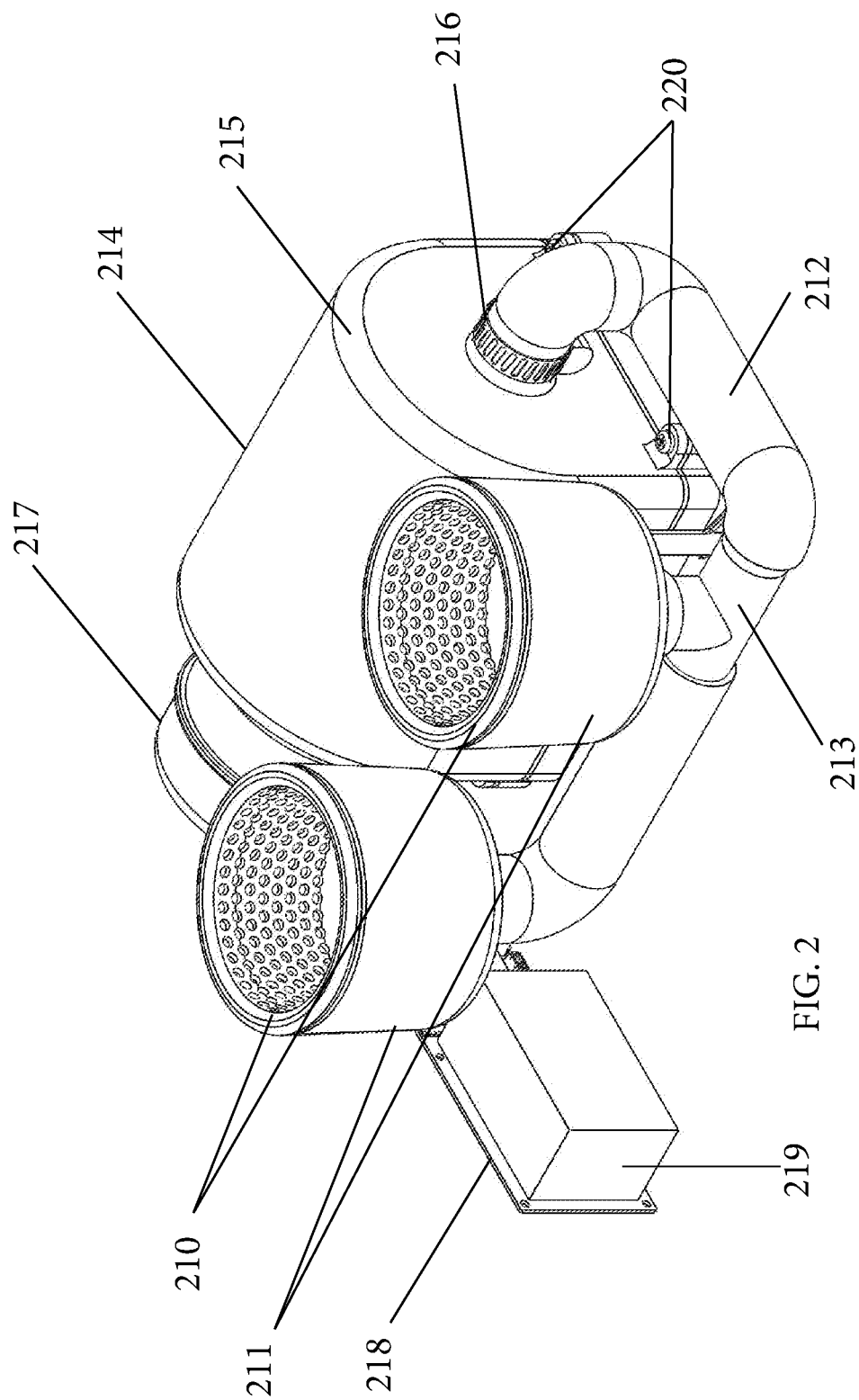
FIG. 2 shows a component module of a touchless paw care device according to one embodiment.

FIG. 2 shows a touchless paw care module according to one embodiment. A touchless paw care device as shown in FIG. 2 includes the following components: a first and a second paw cup insert 210; a first and a second paw cup 211; a vacuum hose 212; a three-way connector 213; a motor 214; a motor enclosure 215; a hose clamp 216; a muffler 217; a controller 218; and a power source 219.

In embodiments, a first and a second paw cup 211 have an opening configured to receive the paws of an animal and also have an air inlet opening. In embodiments, a first and a second paw cup 211 are approximately 4.65 inches in diameter to accommodate the paws of large dogs. In embodiments, a first and a second paw cup 211 are spaced approximately 7 inches apart. In embodiments, a first and a second paw cup are mechanically coupled to a first opening of a vacuum hose 212.

In embodiments, a first and a second paw cup 211 are configured to be fitted with a removably coupled paw cup insert 210. In embodiments, a first and a second paw cup insert 210 are configured to limit the maximum depth an animal can step into a first and a second paw cup 211. In embodiments, a first and a second paw cup insert 210 are configured to facilitate air flow. In embodiments a first and a second paw cup insert 210 is perforated. In embodiments, a first and a second paw cup insert 210 are configured to adapt the size of a first and a second paw cup 210 to accommodate smaller dog paws. In embodiments, a first and a second paw cup insert 210 may be approximately 3.9 inches in diameter. In embodiments, a first and a second paw cup insert 211 may be plastic. In embodiments, a first and a second paw cup insert 211 may be metal.

In embodiments, an at least first vacuum hose 212 connects an air inlet of a first and a second paw cup 211 to a motor 214. In embodiments, an at least first vacuum hose 212 may be rubber. In embodiments an at least first vacuum hose 212 may be plastic. In embodiments, an at least first vacuum hose 212 is bisected by a three way connector 213 to facilitate air flow from a motor 214 to a first and a second paw cup 211 with the at least first vacuum hose only. In embodiments an opening of an at least first vacuum hose 212 is mechanically coupled to a motor enclosure 215 and secured by a hose clamp 216 to form an air-tight seal. In embodiments, one or more additional components is mechanically coupled to an at least first vacuum hose 212 at an inlet to augment the air flowing to a first and a second paw cup 211. For example, in embodiments a negative ion generating device is coupled to an at least first vacuum hose 212 at an inlet to enhance the sanitizing capability of the air flowing to an at least first and at least second paw cup 211. In embodiments, a filter is removably coupled to an at least first vacuum hose 212 to keep the motor 214 free of contaminants.

In embodiments, a motor 214 is a reversible electric motor capable of both forcing air and creating suction. In embodiments, a motor 214 is mechanically coupled to a first and a second paw cup 211 by an at least first vacuum hose 212. In embodiments, a motor 214 gradually builds to maximum power output to reduce the likelihood of startling the animal in the machine.

In embodiments, a motor 214 is enclosed in a motor housing 215 to protect both the device and the animal in the device. In embodiments, a motor housing 215 may be plastic to optimize weight, cost, and durability. In embodiments, a motor enclosure 215 may be aluminum or another metal to enhance durability.

The device disclosed herein addresses the issue of dogs suffering from noise anxiety. A practical concern is whether the device will scare the animal inside. As a case in point, many dogs become startled, if not frightened, by the sound of a vacuum cleaner. Accordingly, in embodiments, a muffler 217 dampens the sound generated by operating a motor 214. In embodiments, a muffler 217 is mechanically coupled to a motor 214 to decrease proximity and optimize sound dampening. In embodiments, an exemplary muffler 217 is configured to fit a three to four horse power lawn mower engine. In embodiments, a muffler 217 is customized for the form factor of the motor.

In embodiments, a controller may be configured to reverse the direction of the motor to either blow air or create suction. In embodiments, a controller 218 includes a potentiometer electrically coupled to motor 217 and power source 219. In embodiments, a controller 218 incrementally increases power supplied to the motor 214 to facilitate linear acceleration of the motor to full power. The intent is that the animal can build some comfort level in the machine before the motor reaches its peak power and sound output. In embodiments, a controller 218 supplies sufficient power to run a motor 217 for approximately 60 seconds. In embodiments, a controller 218 is adapted to have a user interface. In embodiments, a user interface of a controller 218 may be an analog interface like a switch or a button. In embodiments, a user interface of a controller 218 may be a digital interface. In embodiments, a user interface of a controller 218 may be a wireless interface.

In embodiments, a power source 219 is electrically coupled to a motor 214. In embodiments, a power source 219 is a 120 Volt AC power source. In embodiments, a power source 219 is an at least first battery.

Figure 3:
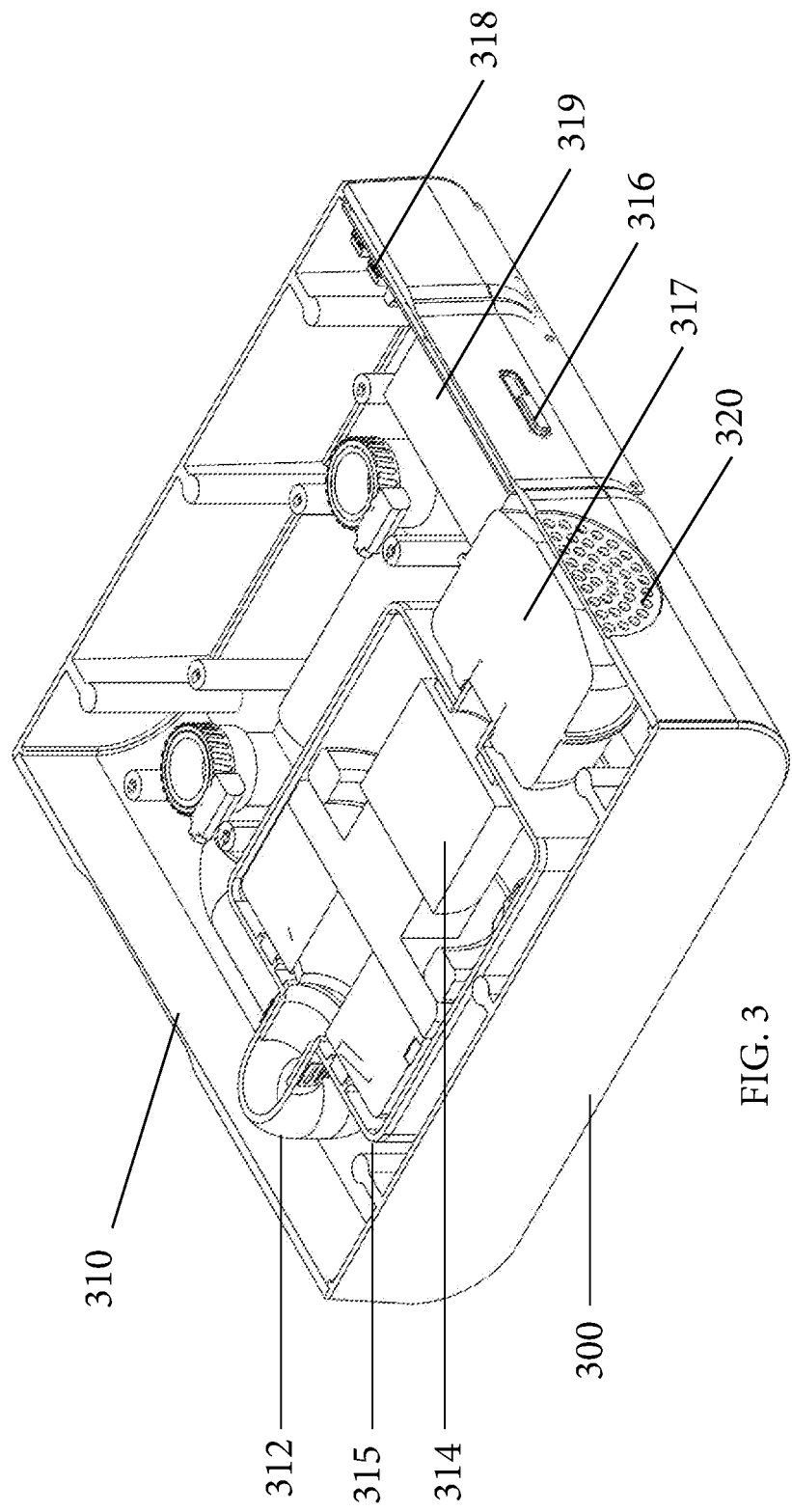
FIG. 3 shows a cross-sectional view of a touchless paw care device according to one embodiment.

FIG. 3 shows a cross sectional view of a touchless paw care device according to one embodiment. In embodiments, a touchless paw care device is a touchless paw care module mechanically coupled to a base 310. In embodiments, a base 310 comprises a top enclosure and a bottom enclosure. In embodiments, a top enclosure and a bottom enclosure of a base 310 may be mechanically coupled using a fastener like a screw. In embodiments, a top enclosure and a bottom enclosure of a base 310 may be adapted to be mechanically coupled without a fastener. In embodiments, a base 310 may be plastic to optimize weight and durability. In embodiments, a base 310 may be metal to optimize durability and/or aesthetic appeal.

According to the embodiment shown in FIG. 3 when a motor 314 is in a blowing state, air flows through a vacuum hose 312 into a first and a second paw cup not shown in the cross-sectional view. According to the embodiment shown in FIG. 3, when a motor 314 is creating suction air flows in through a first and a second paw cup (not shown in the cross-sectional view) through a vacuum hose 312 toward a motor 314 and exits through a muffler 317 and an exhaust 320. In embodiments, a fan blade may be mechanically coupled to a motor 314.

In embodiments, a touchless paw care module includes a switch 316 that controls power to a touchless paw care module. In embodiments, a switch 316 is mechanically coupled to a base 310 and electrically coupled to a power source 319. In embodiments, a switch 316 may be a button switch. In embodiments, a switch 316 may be a toggle switch.

In embodiments, a base 310 is adapted for an exhaust port 320 to facilitate air flow through a muffler 317. In embodiments, a base 310 is molded with perforations for exhaust 320.

Figure 4:
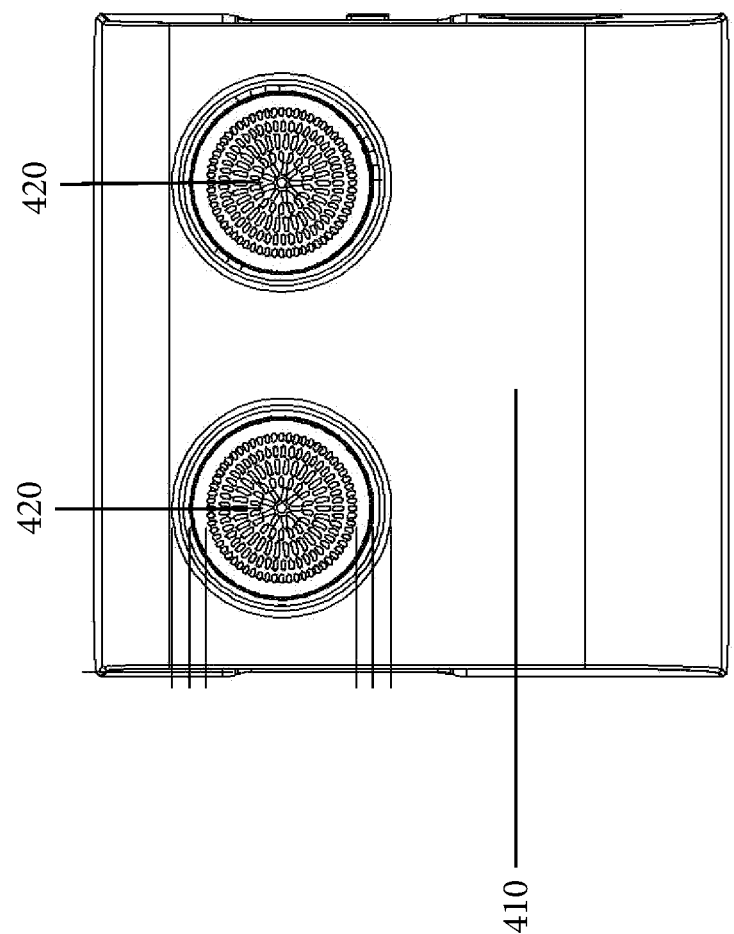
FIG. 4 shows a top view of a touchless paw care device according to one embodiment.

FIG. 4 shows a touchless paw care device according to one embodiment. In embodiments of a touchless paw care device, a first and a second paw cup 420 are vertically inset in a base 410.

Figure 5:
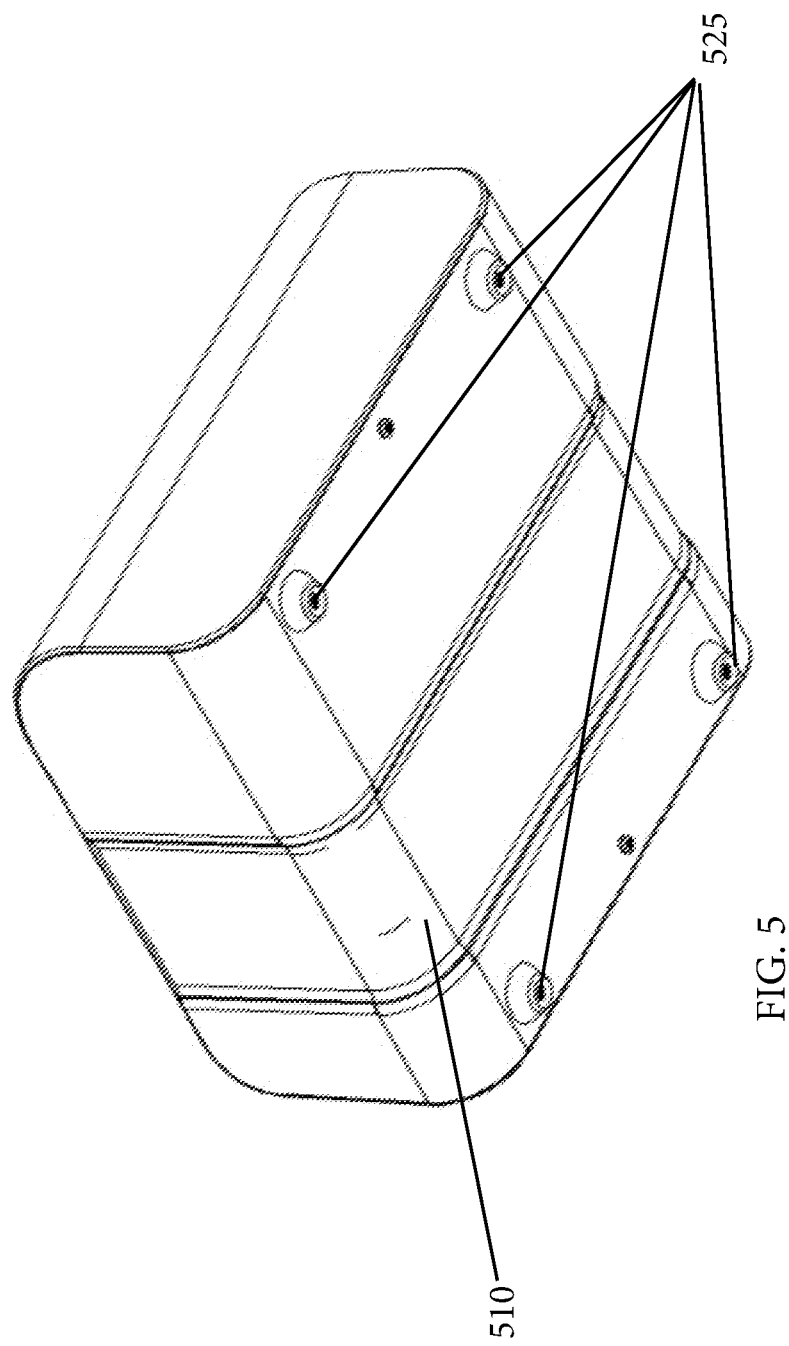
FIG. 5 shows a bottom perspective view of a touchless paw care device according to one embodiment.

FIG. 5 shows a touchless paw care device according to one embodiment. In embodiments a base 510 of a touchless paw care device is adapted to prevent sliding. In embodiments, a base 510 of a touchless paw care device comprises at least a first, a second, a third, and a fourth foot protrusion 525 to prevent sliding.

Figure 6:
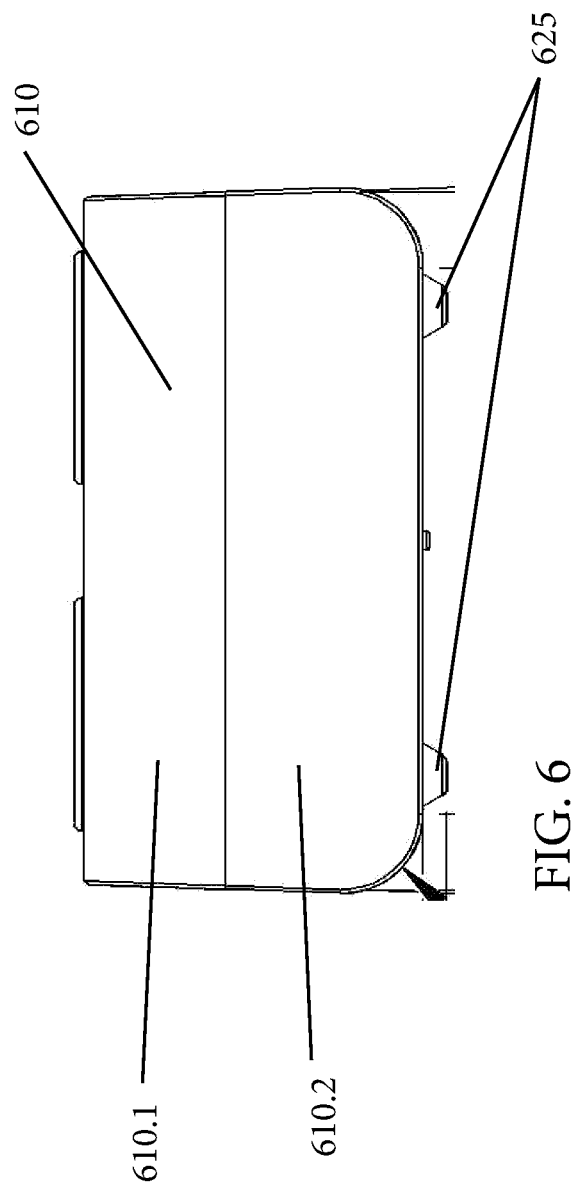
FIG. 6 shows a rear view of a touchless paw care device according to one embodiment.

FIG. 6 shows a rear view of a touchless paw care device according to one embodiment. In embodiments a base 610 of a touchless paw care device comprises a top enclosure 610.1 and a bottom enclosure 610.2. In embodiments, a bottom enclosure 610.2 is adapted to have a first, a second, a third, and a fourth foot protrusion 625 to prevent the device from sliding.

Figure 7:
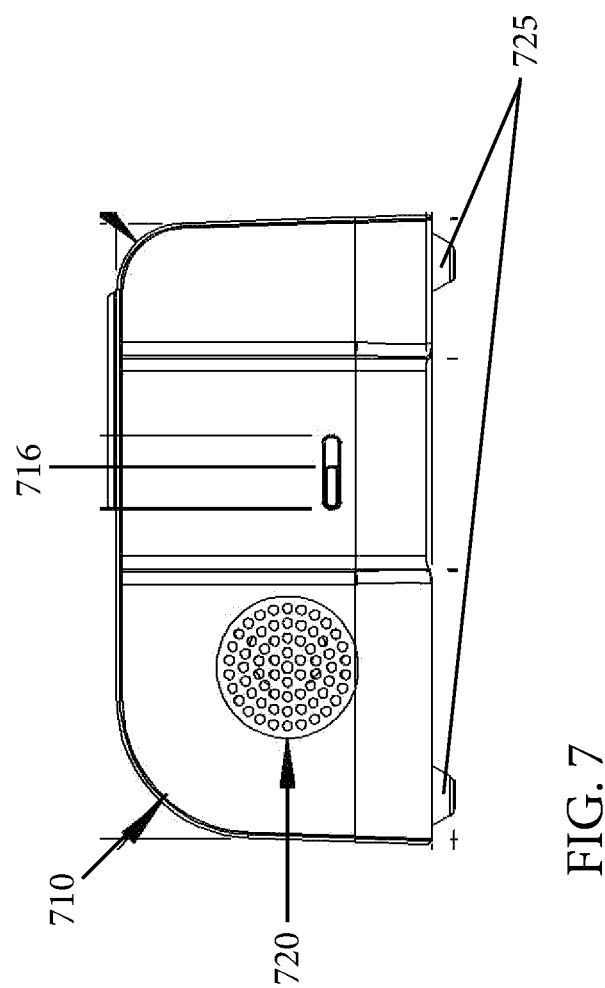
FIG. 7 shows a right-side view of a touchless paw care device according to one embodiment.

FIG. 7 shows a right side view of a touchless paw care device according to one embodiment. In embodiments, a base 710 of a touchless paw care device is adapted to comprise an exhaust 720 and a first, a second, a third, and a fourth foot protrusion 725. In embodiments, a base 710 of a touchless paw care device is adapted to facilitate a user to toggle a switch 716.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof

I claim:

1. A touchless paw care device comprising:
a base having a top enclosure and a bottom enclosure, the bottom enclosure adapted to have a partial opening for exhaust, the bottom enclosure adapted to be mechanically coupled to the top enclosure, the bottom enclosure adapted to have a first, a second, a third, and a fourth foot protrusion;
a touchless paw care module having a first and a second paw cup insert, a first and a second paw cup, the first and the second paw cup insert removably coupled to the first and second paw cup, a vacuum hose, a three-way connector, the vacuum hose adapted to be mechanically coupled to the first paw cup and the second paw cup by the three way connector, a reversible electric motor, the reversible electric motor mechanically coupled to the vacuum hose, a muffler, the muffler mechanically coupled to the motor;
wherein the touchless paw care module mechanically coupled to the base;
a controller, the controller electrically coupled to the touchless paw care module via the motor and mechanically coupled to the base;
a switch, the switch electrically coupled to the controller and mechanically coupled to the base; and
a power source electrically coupled to the switch and mechanically coupled to the base.

2. A method for cleaning a pet animal's paws comprising:
positioning a pet animal in a touchless paw care device, the touchless paw care device having a base having a top enclosure and a bottom enclosure, the bottom enclosure adapted to have a partial opening for exhaust, the bottom enclosure adapted to be mechanically coupled to the top enclosure, the bottom enclosure adapted to have a first, a second, a third, and a fourth foot protrusion; a touchless paw care module having a first and a second paw cup insert, a first and a second paw cup, the first and the second paw cup insert removably coupled to the first and second paw cup, a vacuum hose, a three-way connector, the vacuum hose adapted to be mechanically coupled to the first paw cup and the second paw cup by the three way connector, a reversible electric motor, the reversible electric motor mechanically coupled to the vacuum hose, a muffler, the muffler mechanically coupled to the motor; wherein the touchless paw care module mechanically coupled to the base; a controller, the controller electrically coupled to the touchless paw care module via the motor and mechanically coupled to the base; a switch, the switch electrically coupled to the controller and mechanically coupled to the base; and a power source electrically coupled to the switch and mechanically coupled to the base; and toggling the touchless paw care device between either a first state wherein the touchless paw care device blows air on the pet animal's paws or a second state wherein the touchless paw care device sucks air away from the pet animal's paws.

\* \* \* \* \*